US008941592B2

(12) United States Patent
Kwa et al.

(10) Patent No.: US 8,941,592 B2
(45) Date of Patent: Jan. 27, 2015

(54) TECHNIQUES TO CONTROL DISPLAY ACTIVITY

(75) Inventors: Seh W. Kwa, Saratoga, CA (US); Ravi Ranganathan, Sunnyvale, CA (US); Jun Shi, San Jose, CA (US); Maximino Vasquez, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 509 days.

(21) Appl. No.: 12/889,681

(22) Filed: Sep. 24, 2010

(65) Prior Publication Data

US 2012/0075188 A1 Mar. 29, 2012

(51) Int. Cl.
| | |
|---|---|
| G06F 3/038 | (2013.01) |
| G06F 13/14 | (2006.01) |
| G06F 3/14 | (2006.01) |
| G06F 9/06 | (2006.01) |
| G09G 3/20 | (2006.01) |
| G06F 3/02 | (2006.01) |
| G09G 5/00 | (2006.01) |
| H04L 25/02 | (2006.01) |
| G06F 13/00 | (2006.01) |
| G06F 1/32 | (2006.01) |

(52) U.S. Cl.
CPC ........ G06F 3/14 (2013.01); G06F 13/14 (2013.01); G06F 9/06 (2013.01); G09G 5/00 (2013.01); G09G 3/2096 (2013.01); H04L 25/0272 (2013.01); G06F 13/00 (2013.01); G09G 2330/021 (2013.01); G09G 2360/18 (2013.01); G09G 2370/04 (2013.01); G09G 2370/14 (2013.01); G06F 1/3265 (2013.01); Y02B 60/1242 (2013.01)
USPC ........... 345/168; 345/204; 345/211; 345/520; 345/522

(58) Field of Classification Search
None
See application file for complete search history.

(56) References Cited

U.S. PATENT DOCUMENTS

| | | | |
|---|---|---|---|
| 5,919,263 | A | 7/1999 | Kikinis et al. |
| 7,017,053 | B2 | 3/2006 | Mizuyabu et al. |
| 7,222,155 | B1 | 5/2007 | Gebhardt et al. |
| 7,558,264 | B1 | 7/2009 | Lolayekar et al. |
| 7,839,860 | B2 | 11/2010 | Kobayashi |
| 7,864,695 | B2 | 1/2011 | Morinaga et al. |
| 2003/0081005 | A1 | 5/2003 | Lin et al. |

(Continued)

FOREIGN PATENT DOCUMENTS

| | | |
|---|---|---|
| CN | 1393009 A | 1/2003 |
| CN | 101292278 A | 10/2008 |

(Continued)

OTHER PUBLICATIONS

Panel Standardization Working Group, "Industry Standard Panels for Monitors—15.0-inch", Mounting and Top Level Interface Requirements, Panel Standardization Working Group, version 1.1, Mar. 12, 2003, pp. 1-19.

(Continued)

Primary Examiner — Joe H Cheng
Assistant Examiner — Kwin Xie
(74) Attorney, Agent, or Firm — Glen B Choi

(57) ABSTRACT

Techniques are described to transmit commands to a display device during vertical or horizontal blanking intervals. The commands can be transmitted using fields that would otherwise be used to transmit color information. A Low Voltage Differential Signaling (LVDS) compliant interface can be used to transmit the commands.

19 Claims, 3 Drawing Sheets

(56) References Cited

U.S. PATENT DOCUMENTS

| | | | |
|---|---|---|---|
| 2005/0162414 A1* | 7/2005 | Kubota | 345/204 |
| 2007/0052857 A1* | 3/2007 | Song et al. | 348/565 |
| 2007/0091359 A1 | 4/2007 | Suzuki et al. | |
| 2007/0150616 A1 | 6/2007 | Baek et al. | |
| 2007/0152993 A1* | 7/2007 | Mesmer et al. | 345/211 |
| 2007/0205998 A1* | 9/2007 | Lee et al. | 345/204 |
| 2008/0008172 A1 | 1/2008 | Kobayashi | |
| 2008/0143695 A1 | 6/2008 | Juenemann et al. | |
| 2009/0125940 A1 | 5/2009 | Kim et al. | |
| 2009/0158377 A1 | 6/2009 | Diab et al. | |
| 2009/0179878 A1 | 7/2009 | Nakamura | |
| 2010/0080218 A1 | 4/2010 | Kwa et al. | |
| 2010/0087932 A1 | 4/2010 | Mccoy et al. | |

FOREIGN PATENT DOCUMENTS

| | | | |
|---|---|---|---|
| JP | 2001-016221 A | 1/2001 | |
| JP | 2001-016222 A | 1/2001 | |
| JP | 2002-091411 A | 3/2002 | |
| JP | 2005-027120 A | 1/2005 | |
| JP | 2006-268738 A | 10/2006 | |
| JP | 2008-084366 A | 4/2008 | |
| JP | 2008-109269 A | 5/2008 | |
| JP | 2008-182524 A | 8/2008 | |
| JP | 2009-518693 A | 5/2009 | |
| TW | 243523 A | 3/1995 | |
| TW | 200746782 A | 12/2007 | |
| TW | 200825873 A | 6/2008 | |
| WO | 2012/040660 A2 | 3/2012 | |
| WO | 2012/040660 A3 | 6/2012 | |

OTHER PUBLICATIONS

International Search Report & Written Opinion for PCT Application No. PCT/US2011/053145, mailed Apr. 24, 2012, 6 pages.
"Section 2.2.5.4 Extension Packet", VESA DisplayPort Standard, Video Electronics Standards Association, Version 1, Revision 1a, Jan. 11, 2008, pp. 1 and 81-83.
Office Action received for Korean Patent Application No. 10-2009-92283, mailed on Feb. 12, 2011, 2 pages of English Translation and 3 pages of Office Action.
"VESA Embedded DisplayPort Standard", Video Electronics Standards Association (VESA), Version 1.3, Jan. 13, 2011, pp. 1-81.
Office Action received for Korean Patent Application No. 10-2009-111387, mailed on Mar. 9, 2011, 7 pages of English Translation and 5 pages of Office Action.
Office Action received for Japanese Patent Application No. 2009-222990, mailed on Aug. 2, 2011, 4 pages of Japanese Office Action including 2 pages of English Translation.
"VESA Embedded DisplayPort (eDP)", VESA eDP Standard, Copyright 2008 Video Electronics Standards Association, Version 1, Dec. 22, 2008, pp. 1-23.
"VESA Embedded DisplayPort (eDP) Standard", Embedded DisplayPort, Copyright 2008-2009 Video Electronics Standards Association, Version 1.1, Oct. 23, 2009, pp. 1-32.
"VESA Embedded DisplayPort Standard", eDP Standard, Copyright 2008-2010 Video Electronics Standards Association, Version 1.2, May 5, 2010, pp. 1-53.
Office Action received for Chinese Patent Application No. 200910221453.6, mailed on Oct. 10, 2011, 8 pages of Chinese Office Action including 4 pages of English Translation.
Office Action Received in Korean Patent Application No. 10-2009-92283, mailed Apr. 9, 2012, 7 pages of English Translation and 4 pages of Office Action.
Office Action received in Chinese Patent Application No. 200910221453.6, mailed Jul. 23, 2012, 5 pages of Office Action including 2 pages of English translation.
Office Action received for Korean Patent Application No. 10-2009-0092283, mailed on Oct. 27, 2011, 4 pages of English Translation and 3 pages of Office Action.
Office Action received in Korean Patent Application No. 10-2009-92283, mailed Oct. 31, 2012, 4 pages of English Translation and 3 pages of Office Action.
Search Report Received in Taiwan Patent Application No. 98132686, mailed Dec. 26, 2012, 19 pages of Taiwanese Office Action and 1 page of English Translation of Search Report.
Non-Final Office Action received in U.S. Appl. No. 12/286,192, mailed Apr. 29, 2010, 7 pages of Office Action.
Non-Final Office Action received in U.S. Appl. No. 13/089,731, mailed Jul. 22, 2011, 7 pages of Office Action.
Non-Final Office Action received in U.S. Appl. No. 13/349,276, mailed Jul. 2, 2012, 7 pages of Office Action.
"VESA DisplayPort Standard", Video Electronics Standards Association (VESA), Version 1.1a, Jan. 11, 2008, 5 pages.
International Preliminary Report for PCT Application No. PCT/US2011/053145, mailed Apr. 4, 2013, 5 pages.
Office Action Recieved in Taiwanese Patent Application No. 100134381, mailed on Apr. 14, 2014, 7 pages of English Translation and 7 pages of Office Action.
Office Action Received in Japanese Patent Application No. 2012-031772, mailed on May 14, 2013, 2 pages of English Translation and 2 pages of Office Action.
Office Action Received in Korean Patent Application No. 10-2013-7004123, mailed on Feb. 6, 2014, 4 pages of English Translation and 4 pages of Office Action.
Office Action Received in Taiwan Patent Application No. 98132686, mailed on Nov. 5, 2013, 1 page of English Translation and 5 pages of Office Action.
Office Action Received in Japanese Patent Application No. 2013-528399, mailed on Apr. 1, 2014, 1 page of English Translation and 2 pages of Office Action.
Office Action Received in Chinese Patent Application No. 201180002821.3, mailed on May 27, 2014, 1 page of English Translation and 15 pages of Office Action.
Office Action Received in Japanese Patent Application No. 2013-528399, mailed on Oct. 7, 2014, 1 page of English Translation and 1 page of Office Action.

* cited by examiner

TECHNIQUES TO CONTROL DISPLAY ACTIVITY

RELATED APPLICATION

This application is related to co-pending U.S. patent application Ser. No. 12/286,192, entitled "Protocol Extensions in a Display Port Compatible Interface," inventors Kwa et al., filed Sep. 29, 2008.

FIELD

The subject matter disclosed herein relates generally to techniques for controlling a display device.

RELATED ART

Multimedia operations in computer systems are very common. For example, personal computers are often used to process and display video. Power consumption by computers is a concern. It is desirable to regulate power consumption by personal computers. In particular, it is desirable to regulate power consumption of a display device used by a personal computer.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1A:
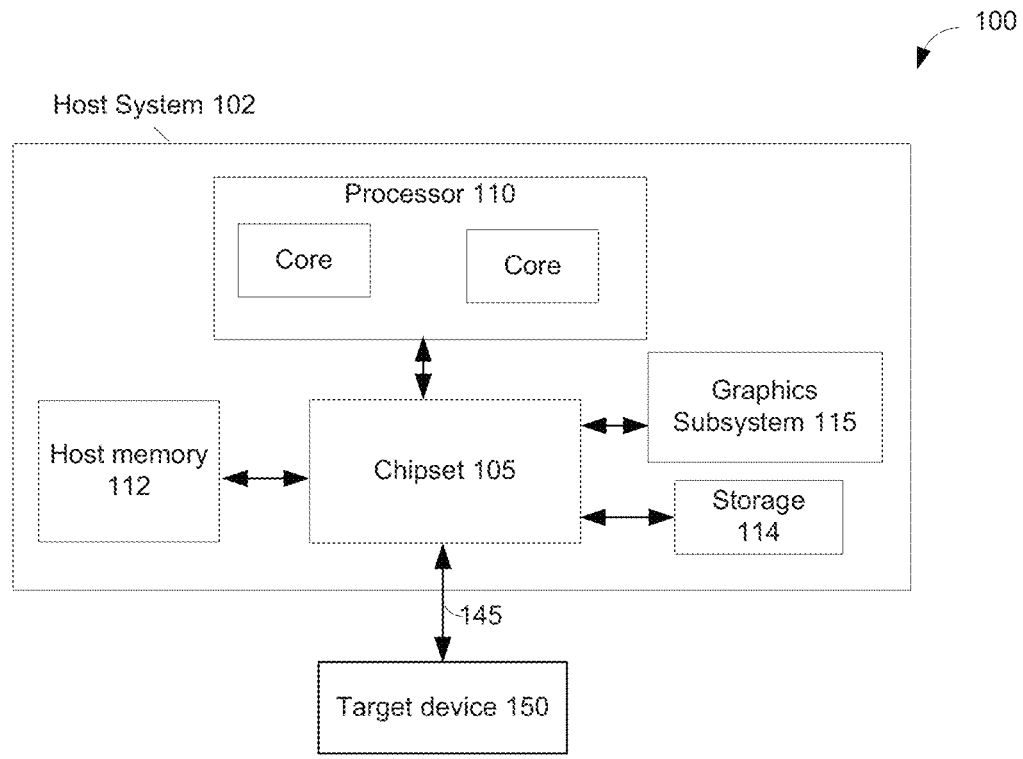
FIG. 1A depicts a system in accordance with an embodiment.

FIG. 1A depicts a system 100 in accordance with an embodiment. System 100 may include a source device, such as a host system 102, and a target device 150. Host system 102 may include a processor 110 with one or more cores, host memory 112, storage 114, and graphics subsystem 115. Chipset 105 may communicatively couple devices in host system 102. Graphics subsystem 115 may process video and/or audio. System 100 can be implemented in a handheld personal computer, mobile telephone, set top box, or any computing device. Any type of user interface is available such as a keypad, mouse, touch screen, and/or motion sensor.

In accordance with various embodiments, processor 110 may execute a driver (not depicted) that determines whether to (1) instruct target device 150 to capture an image and repeatedly display the captured image, (2) power down components of graphics subsystem 115, and/or (3) power down components of target device 150. The driver may determine whether to initiate actions (1), (2), or (3) based at least on: a change in the system timer period, triangle or polygon rendering, any processor core is not in low power mode, any mouse activity, vertical blanking interrupts are used, and/or overlay is enabled. For example, powering down components may involve reducing voltage regulators to the lowest operating voltage level. Powering down components may involve reducing power consumption of components. For example, when the processor 110 executes a Microsoft Windows compatible operating system, the driver may be a kernel mode driver.

For example, host system 102 may transmit commands to target device 150 using interface 145. Interface 145 may comply with Low Voltage Differential Signaling (LVDS) as described in ANSI/TIA/EIA-644. The format of signals transmitted over interface 145 can be that described in Section 3.1.4 of Panel Standardization Working Group's Industry Standard Panels for Monitors—15.0-inch (ISP 15-inch) Mounting and Top Level Interface Requirements (Version 1.1), Mar. 12, 2003, although other standards and formats can be used. Examples of commands transmitted over interface 145 are described with regard to tables below.

In some embodiments, interface 145 may include a Main Link and an AUX channel, both described in Video Electronics Standards Association (VESA) DisplayPort Standard, Version 1, Revision 1a (2008) as well as revisions and variations thereof. In various embodiments, host system 102 (e.g., graphics subsystem 115) may form and transmit communications to target device 150 at least in a manner described with respect to co-pending U.S. patent application having Ser. No. 12/286,192, entitled "Protocol Extensions in a Display Port Compatible Interface," inventors Kwa et al., filed Sep. 29, 2008.

Target device 150 may be a display device with capabilities to display visual content and render audio content. For example, target device 150 may include control logic such as a timing controller (TCON) that controls writing of pixels as well as a register that directs operation of target device 150. Target device 150 may have access to a memory or frame buffer from which to read frames for display.

Figure 1B:
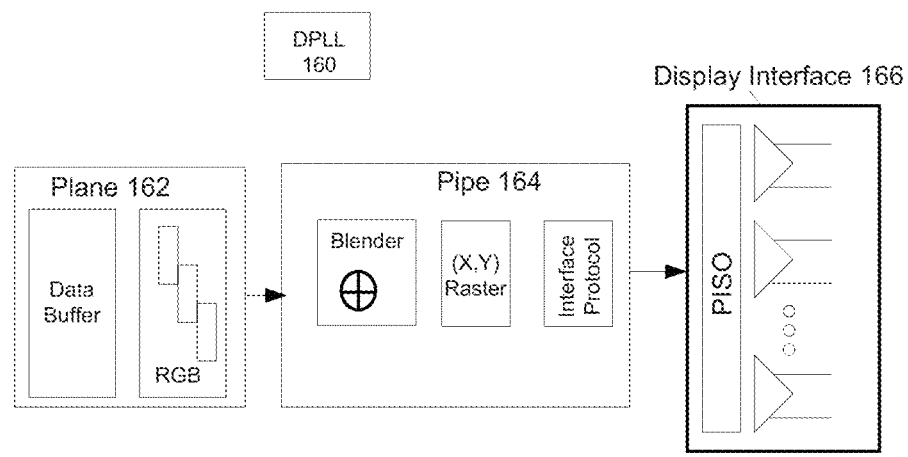
FIG. 1B depicts an example of components of a host system whose power consumption can be controlled, in accordance with an embodiment.

FIG. 1B depicts an example of components of host system 102 whose power consumption can be controlled (e.g., power consumption decreased or increased), in accordance with an embodiment. The components can be in a chipset, processor, or graphics subsystem. For example, the display phase lock loop (PLL) 160, display plane 162, display pipe 164, and display interface 166 of host 102 can be powered down or up. PLL 160 may be a system clock for the display plane 162, display pipe 164, and/or display interface 166. For example, display plane 162 may include a data buffer and RGB color mapper, which transforms data from buffer to RGB. Display plane 162 may include an associated memory controller and memory input/output (IO) (not depicted) that could also be power managed. Pipe 164 may include a blender of multiple layers of images into a composite image, X, Y coordinate rasterizer, and interface protocol packetizer. The interface protocol packetizer may be compliant at least with Display Port or Low-voltage differential signaling (LVDS), available from ANSI/TIA/EIA-644-A (2001), as well as variations thereof. Display interface 166 may include a DisplayPort or LVDS compatible interface and a parallel-in-serial-out (PISO) interface.

Figure 1C:
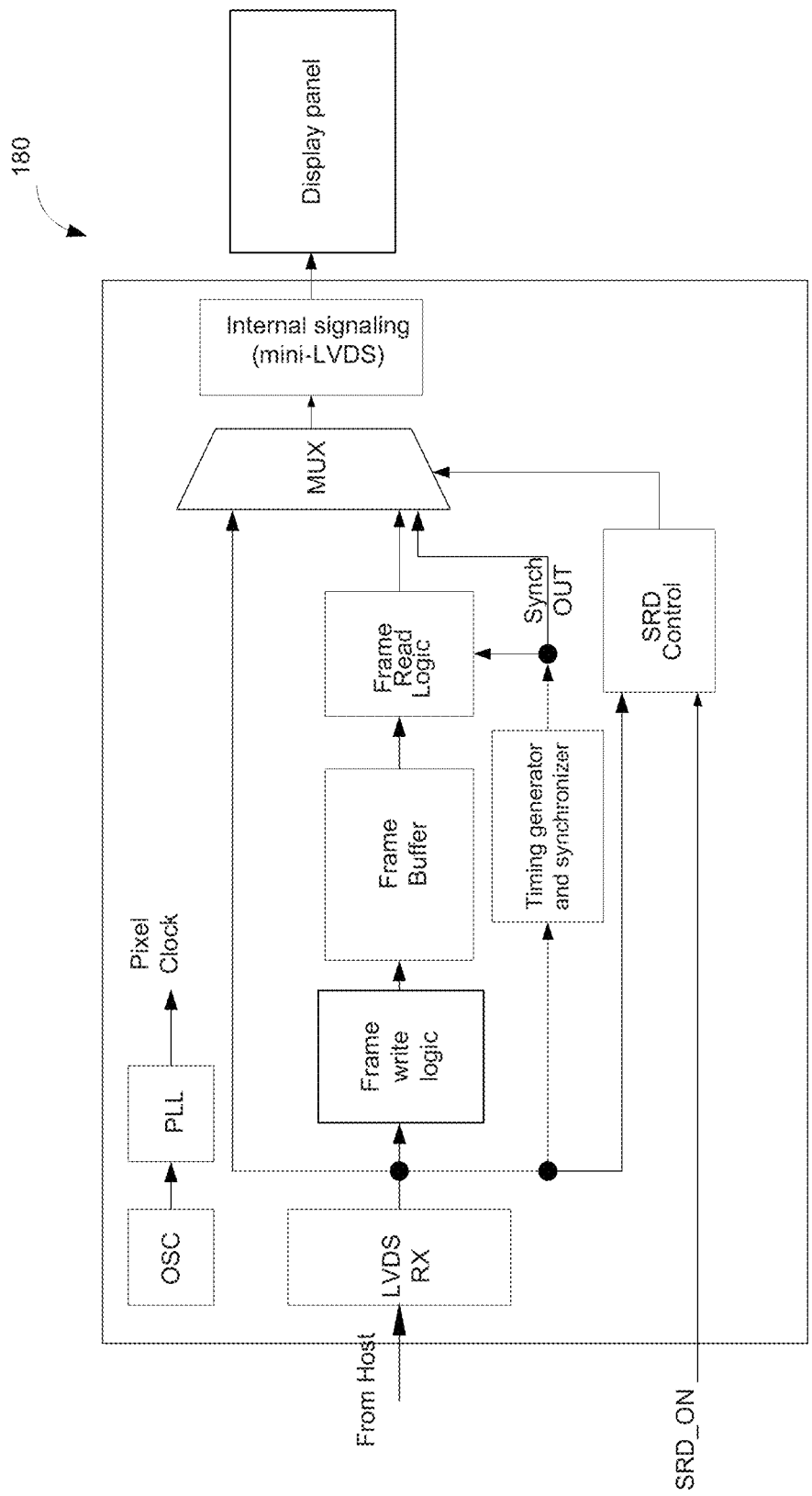
FIG. 1C depicts a high level block diagram of a timing controller for a display device in accordance with an embodiment.

FIG. 1C depicts a high level block diagram of a timing controller for a display device in accordance with an embodiment. Timing controller (TCON) 180 has the capability to respond to instructions from a host device to enter a self refresh mode that may include powering down components and/or capturing an image and repeatedly outputting the captured image to a display. In response to signal SRD_ON going active, SRD control block activates the frame buffer to capture a frame and the SRD control block controls the multiplexer (MUX) to transfer the captured frame to the output port. After the signal SRD_ON is deactivated, SRD control block deactivates the frame buffer and associated logic and causes the MUX to transfer incoming video from the input port (LVDS RX) to the output port (internal signaling (mini-LVDS)). Timing controller 180 may use less power because the frame buffer is turned off and the logic clock gated when the self refresh display mode is exited. In various embodiments, SRD_ON can be signals from a host or configured in a register.

Figure 2:
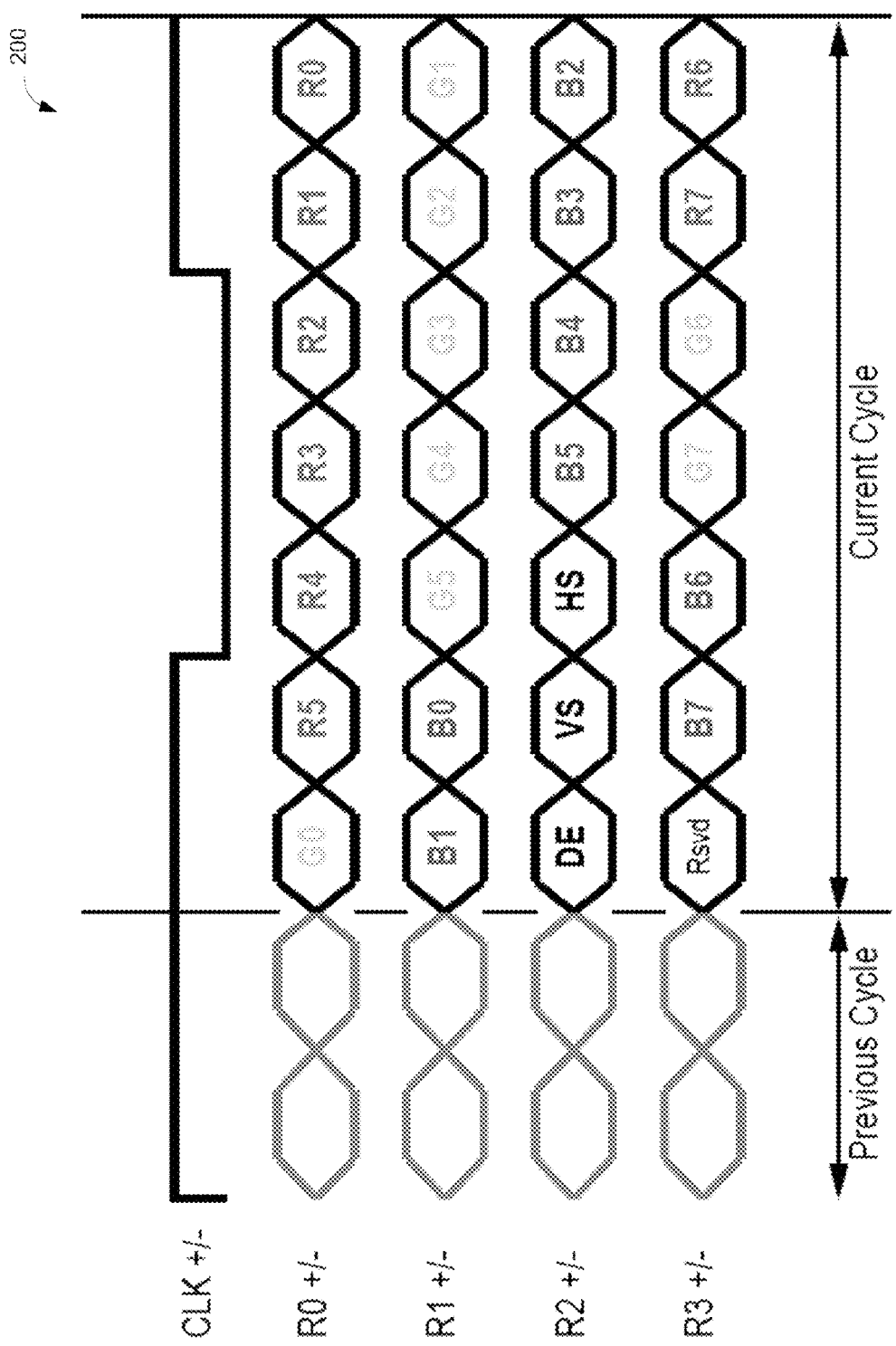
FIG. 2 depicts an example of signals transmitted periodically using an LVDS compliant interface.

FIG. 2 depicts an example of signals transmitted to a display device periodically using an LVDS compliant interface. A CPU or chipset with an LVDS compliant display interface could transmit commands by using signals reserved to communicate color information. A timing controller or related electronics in the display device could receive the signals. The format of signals can be that described in Section 3.1.4 of Panel Standardization Working Group's Industry Standard Panels for Monitors—15.0-inch (ISP 15-inch) Mounting and Top Level Interface Requirements (Version 1.1), Mar. 12, 2003, although other specifications and standards can be used.

In accordance with various embodiments, during a vertical blanking interval or horizontal blanking interval, bits reserved for color data can be used to transmit other types of information or commands. The following table provides commands that can be used to command a retrace to a location on a display.

TABLE 1

| VSync (VS) | HSync (HS) | DE | B3 | B2 | B1 | B0 | Brief Description |
|---|---|---|---|---|---|---|---|
| 1 | x | 0 | x | x | x | x | Retrace to top of screen. |
| 0 | 1 | 0 | x | x | x | x | Retrace to beginning of line. |

The command in the top row is a Vsync command, which indicates starting a vertical blanking interval (VBI) and beginning of a new frame by retracing to the top left corner of a screen. Value "x" indicates the value can be either 0 or 1. The command can be transmitted during a horizontal or vertical blanking interval.

The command in the bottom row is an Hsync command, which indicates starting a horizontal blanking interval by retracing to the left side of the screen. The command can be transmitted during a horizontal or vertical blanking interval.

In some cases, bits B3, B2, B1, and B0 shown in Table 1 (and Tables 2-4) can be respective bits G0, R5, B1, and B0. Bits G0, R5, B1, and B0 are the top-left four bits of the fields reserved to communicate color information shown in FIG. 2. In other cases, bits B3, B2, B1, and B0 shown in Table 1 (and Tables 2-4) can be respective bits B3, B2, B1, and B0 reserved to communicate color information shown in FIG. 2. Of course, any four (4) bits can be used to carry information of bits B3, B2, B1, and B0 shown in Table 1 (and Tables 2-4). When color other than 8-bit is used, such as 6-bit color, bits B3, B2, B1, and B0 shown in Table 1 (and Tables 2-4) can be transmitted in any of the bits designated for color data. The color field can be extended beyond 8-bits such as, but not limited to, 24 bits. More commands or variations of commands can be used when the color field is a larger number of bits.

The following table provides commands that can be used to initiate frame capture, start a self refresh mode, or exit a self refresh mode.

TABLE 2

| VSync (VS) | HSync (HS) | DE | B3 | B2 | B1 | B0 | Description |
|---|---|---|---|---|---|---|---|
| 1 | 0 | 1 | 0 | 0 | 0 | 1 | Capture this frame in remote frame buffer. |
| 1 | 0 | 1 | 0 | 0 | 1 | 0 | Start self refresh mode. |
| 1 | 0 | 1 | 0 | 0 | 0 | 0 | Stop self refresh mode. Display interface to resume streaming pixel data. |

The command in the top row of Table 2 is to capture a frame in a frame buffer. Starting after a VBI, an entire frame is captured into a frame buffer. The frame buffer can be located in the same package or integrated circuit used by the display device or elsewhere but be able to provide frames for display. For example, the frame buffer can be that described with regard to FIG. 1C. In this case, signals B3-B0 provide value 0001. The command can be transmitted during a horizontal or vertical blanking interval.

The command in the middle row of Table 2 is to start self refresh mode using a frame stored in a frame buffer. This command could also cause a display interface to be shutdown or enter reduced power mode. Other components such as those described with regard to FIG. 1B can be shut down or enter lower power usage mode. After a next vertical blanking interval, the image stored in the frame buffer is used for local refresh of a display. For example, if a VBI at the beginning of the frame that is captured is VBI1, then after a subsequent VBI, VBI2, which can be after VBI1 but with one active frame data between VBI1 and VBI2, self refresh mode can be entered. Self refresh can be entered during or after VBI2. During self refresh, active data is not requested to be transmitted to a display by a graphics processing unit or graphics engine. After or about the same time as entering self refresh mode, the display interface as well as other logic described with regard to FIG. 1B can be shut down or enter lower power usage mode. In this case, signals B3-B0 provide value 0010. The command can be transmitted during a horizontal or vertical blanking interval.

The command in the bottom row of Table 2 is to exit self refresh mode and resume streaming pixels from a display interface. After receiving the exit self refresh mode command and at or around a vertical blanking interval VBI3, which is after VBI2, a display commences displaying video from a display interface as opposed to a frame buffer. In addition, the display interface as well as other logic described with regard to FIG. 1B can be powered up and permitted to consume more power. New color data can be transmitted via the channel color mapping signals. In this case, signals B3-B0 provide value 0000. The command can be transmitted during a horizontal or vertical blanking interval.

Table 3 provides commands that are used to start and end partial frame updates.

TABLE 3

| VSync (VS) | HSync (HS) | DE | B3 | B2 | B1 | B0 | Description |
|---|---|---|---|---|---|---|---|
| X | 1 | 1 | b3 | b2 | b1 | b0 | Start partial frame update during self refresh mode by capturing the rows of pixels after row N. |
| X | 1 | 1 | 0 | 0 | 0 | 0 | Indicates last row of partial frame update and to stop partial frame update after this row. |

The command in the top row of Table 3 is to request to start a partial frame update during self refresh mode by writing rows of pixels after row N. Row N is represented by the binary value <b3 b2 b1 b0> and is transmitted via color values B3-B0 or other slots. Accordingly, a display can remain in self refresh mode but display a partially updated frame. This command can be transmitted during a horizontal or vertical blanking interval. Color data transmitted after this command is a partial screen update. Color data can be transmitted immediately after a horizontal blanking interval or vertical blanking interval completes.

The command in the bottom row of Table 3 is to stop a partial frame update. This command indicates that no further data will be sent for the active partial refresh mode. This command follows the command in the top row of Table 3. Values B3-B0 can provide value 0000. This command is used after entry into self refresh and before exit from self refresh mode. The command can be transmitted during a horizontal or vertical blanking interval.

Table 4 provides a command that can be reserved for future use.

TABLE 4

| VSync (VS) | HSync (HS) | DE | B3 | B2 | B1 | B0 | Description |
|---|---|---|---|---|---|---|---|
| 1 | 0 | 1 | b3 | b2 | b1 | b0 | <b3b2b1b0>: ranges from 0x0011b to 0x1111 are reserved for future extensions. |

The command can be transmitted during a horizontal or vertical blanking interval.

For example, the command in Table 4 can be used in connection with transmitting an audio stream embedded in the VBI in cases where the speaker is controlled by the panel.

Some TCON designs use field DE to indicate use that the values in the color fields (i.e., pixel content) are color data. In some cases, Hsync and Vsync as well as a color field can be used to indicate a command. For example, when DE is set to zero, Hsync and Vsync along with a color field can be used to indicate a command. Any color field among R0-R5, B0-B5, or G0-G5 can be used, along with Hsync and Vsync, to indicate commands in the color fields.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Embodiments of the present invention may be implemented as any or a combination of: one or more microchips or integrated circuits interconnected using a motherboard, hard-wired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
    outside of a vertical or horizontal blanking interval, receiving color data in fields allocated for color data;
    during one of a vertical or horizontal blanking interval, receiving information related to a command in the fields allocated for color data, wherein at least one color data field received during a blanking interval is also received outside of the blanking interval;
    receiving a data enable (DE) signal and Hsync and Vsync signals, the received DE signal to indicate whether a combination of the fields allocated for color data and the Hsync and Vsync signals convey a command, wherein when the DE signal indicates the fields allocated for color data and the Hsync and Vsync signals convey a command, the command is specified using values in each of the fields allocated for the color data, Hsync, and Vsync signals; and
    requesting to perform the command.

2. The method of claim 1, wherein the fields allocated for color data are specified in Section 3.1.4 of Panel Standardization Working Group's Industry Standard Panels for Monitors—15.0-inch (ISP 15-inch) Mounting and Top Level Interface Requirements (Version 1.1), Mar. 12, 2003.

3. The method of claim 1, wherein the fields allocated for color data comprise four or more bits, where one of the bits is allocated in a time slot and another of the bits is allocated in a different time slot.

4. The method of claim 1, wherein the receiving information related to a command comprises receiving information related to a command via a Low Voltage Differential Signaling (LVDS) compliant interface.

5. The method of claim 1, wherein the command comprises one of a command to store a frame in a frame buffer, a command to enter self refresh mode, and a command to exit self refresh mode, the self refresh mode to cause storing an image and repeatedly outputting the stored image for display.

6. The method of claim 1, wherein the command comprises one of a command to perform a partial screen update and a command to end performance of a partial screen update.

7. A method comprising:
during one of a vertical or horizontal blanking interval, causing transmission of information related to a command using fields allocated for color data;
outside of a vertical or horizontal blanking interval, causing transmission of color data in the fields allocated for color data, at least one color data field transmitted during a blanking interval is also transmitted outside the blanking interval;
transmitting a data enable (DE) signal; and
transmitting Hsync and Vsync signals, the DE signal to indicate whether a combination of the fields allocated for color data and the Hsync and Vsync signals convey a command, wherein when the DE signal indicates the fields allocated for color data and the Hsync and Vsync signals convey a command, the command is specified using values in each of the fields allocated for the color data, Hsync, and Vsync signals.

8. The method of claim 7, wherein the command comprises one of a command to store a frame in a frame buffer, a command to enter self refresh mode, and a command to exit self refresh mode and wherein the transmissions use a Low Voltage Differential Signaling (LVDS) compliant interface.

9. The method of claim 7, wherein the command comprises one of a command to perform a partial screen update and a command to end performing a partial screen update.

10. The method of claim 7, wherein the fields allocated for color data are specified in Section 3.1.4 of Panel Standardization Working Group's Industry Standard Panels for Monitors—15.0-inch (ISP 15-inch) Mounting and Top Level Interface Requirements (Version 1.1), Mar. 12, 2003.

11. The method of claim 7, wherein the command comprises one of a command to store a frame in a frame buffer, a command to enter self refresh mode, a command to exit self refresh mode, a command to perform partial screen update, and a command to end performance of a partial screen update, wherein the self refresh mode to cause storing an image and repeatedly outputting the stored image for display.

12. The method of claim 7, wherein the fields allocated for color data comprise at least four bits, where one of the bits is allocated in a time slot and another of the bits is allocated in a different time slot.

13. A system comprising:
at least one antenna;
a display device;
a frame buffer;
a host system communicatively coupled to the at least one antenna and the frame buffer; and
an interface to communicatively couple the display device and the host system, the host system comprising:
logic to form a communication for transmission to the display device using the interface, wherein:
during one of a vertical or horizontal blanking interval, the communication is to include information related to a command using fields allocated for color data;
outside of a vertical or horizontal blanking interval, the communication is to include color data in the fields allocated for color data, at least one color data field transmitted during a blanking interval is also transmitted outside the blanking interval; and
the communication is to include a data enable (DE) signal and Hsync and Vsync signals, the DE signal to indicate whether a combination of the fields allocated for color data and the Hsync and Vsync signals convey a command, wherein when the DE signal indicates the fields allocated for color data and the Hsync and Vsync signals convey a command, the command is specified using values in each of the fields allocated for the color data, Hsync, and Vsync signals.

14. The system of claim 13, wherein the fields allocated for color data are specified in Section 3.1.4 of Panel Standardization Working Group's Industry Standard Panels for Monitors—15.0-inch (ISP 15-inch) Mounting and Top Level Interface Requirements (Version 1.1), Mar. 12, 2003.

15. The system of claim 13, wherein the fields allocated for color data comprise at least four bits, where one of the bits is allocated in a time slot and another of the bits is allocated in a different time slot.

16. The system of claim 13, wherein the interface complies at least with Low Voltage Differential Signaling (LVDS).

17. The system of claim 13, wherein the command comprises one of a command to store a frame in a frame buffer, a command to enter self refresh mode, and a command to exit self refresh mode, wherein the self refresh mode to cause storage of an image and repeated output of the stored image for display.

18. The system of claim 13, wherein the command comprises one of a command to perform a partial screen update and a command to end performing a partial screen update.

19. The system of claim 13, further comprising one of a keyboard and touch screen interface.

* * * * *